United States Patent [19]
Cox

[11] Patent Number: 6,006,768
[45] Date of Patent: Dec. 28, 1999

[54] FIBER OPTIC CABLE CLEANER

[75] Inventor: Larry R. Cox, Austin, Tex.

[73] Assignee: 3M Innovative Properties Company, St. Paul, Minn.

[21] Appl. No.: 08/813,275

[22] Filed: Mar. 10, 1997

Related U.S. Application Data

[63] Continuation-in-part of application No. 08/660,644, Jun. 7, 1996, Pat. No. 5,836,031.

[51] Int. Cl.⁶ ........................................................ B08B 3/00
[52] U.S. Cl. ........................ 134/200; 134/166 R; 134/198
[58] Field of Search .................................... 134/198, 200, 134/166 R, 169 R, 6, 15, 32, 167 R, 168 R, 167 C, 168 C; 239/333, 337, 532

[56] References Cited

U.S. PATENT DOCUMENTS

| | | | |
|---|---|---|---|
| 4,028,162 | 6/1977 | Cherin et al. | 156/158 |
| 4,045,121 | 8/1977 | Clark | 350/96 |
| 4,077,702 | 3/1978 | Kunze et al. | 350/96.21 |
| 4,148,559 | 4/1979 | Gauthier | 350/96.21 |
| 4,218,133 | 8/1980 | Uberbacher et al. | 350/96.21 |
| 4,322,127 | 3/1982 | Comerford et al. | 350/96.21 |
| 4,637,089 | 1/1987 | Schwarz | |
| 4,733,428 | 3/1988 | Malinge et al. | 15/302 |
| 4,767,180 | 8/1988 | Zajac et al. | 350/96.21 |
| 4,850,536 | 7/1989 | Teranishi et al. | 239/332 |
| 4,998,672 | 3/1991 | Bordaz et al. | 239/585 |
| 5,080,461 | 1/1992 | Pimpinella | 385/65 |
| 5,144,775 | 9/1992 | Bakanowsky | 15/205 |
| 5,148,572 | 9/1992 | Wells et al. | 15/118 |
| 5,151,964 | 9/1992 | Carpenter et al. | 385/98 |
| 5,210,647 | 5/1993 | Hartnagel et al. | 359/802 |
| 5,230,032 | 7/1993 | Muzslay | 385/66 |
| 5,325,452 | 6/1994 | Stein et al. | 385/67 |
| 5,332,157 | 7/1994 | Proctor | 239/304 |
| 5,381,498 | 1/1995 | Bylander . | |
| 5,381,504 | 1/1995 | Novack et al. | 385/128 |
| 5,472,119 | 12/1995 | Park et al. | 222/145.8 |
| 5,557,696 | 9/1996 | Stein | 385/75 |
| 5,743,468 | 4/1998 | Laidler | 239/115 |
| 5,762,238 | 6/1998 | Liang | 222/321.9 |

FOREIGN PATENT DOCUMENTS

| | | | |
|---|---|---|---|
| 0 298 144 | 1/1989 | European Pat. Off. | G02B 6/38 |
| 0 391 111 | 3/1990 | European Pat. Off. | G02B 6/44 |
| 391 111 | 10/1990 | European Pat. Off. | G02B 6/44 |
| 0 640 857 | 7/1994 | European Pat. Off. | G02B 26/02 |
| 2 660 442 | 4/1991 | France | G02B 6/36 |
| 53-141644 | 9/1978 | Japan | G02B 5/14 |
| 60-256103 | 12/1985 | Japan | G02B 6/24 |
| 62-108213 | 5/1987 | Japan | G02B 6/36 |
| 63-279207 | 11/1988 | Japan | G02B 6/36 |
| 7-287124 | 10/1995 | Japan | G02B 6/00 |
| 1 452 474 | 6/1975 | United Kingdom | G02B 5/14 |
| WO 97/23792 | 7/1997 | WIPO | G02B 6/25 |

OTHER PUBLICATIONS

U.S. application No. 08/122,755, Carpenter et al., filed Sep. 16, 1993.

"Advanced Optical Connectors for Single–Mode Fibers" by NTT Review vol. 3(1991)May, No. 3, Tokyo, Japan, pp. 110–121 by Yasuhiro Ando, Shin–ichi Iwano, Ryo Nagase, Kazunori Kanayama, and Etsuji Sugita.

"Cleaning Stick", IBM Technical Disclosure Bulletin, vol. 30 No. 7, Dec. 1987. Armonk, NY, USA p. 418.

"Advanced Optical connectors for Single–Mode Fibers" by Ando et al., pp. 110–121., NTT Review, vol, 3, No. 3, May 1991.

*Primary Examiner*—Randy Gulakowski
*Assistant Examiner*—Paul J. Lee
*Attorney, Agent, or Firm*—John A. Fortkort

[57] ABSTRACT

A device for cleaning an optical fiber includes a body having a surface. A cleaning substance is deposited on the surface of the body. The body is selectively positionable for selectively contacting the cleaning substance with the optical fiber.

20 Claims, 12 Drawing Sheets

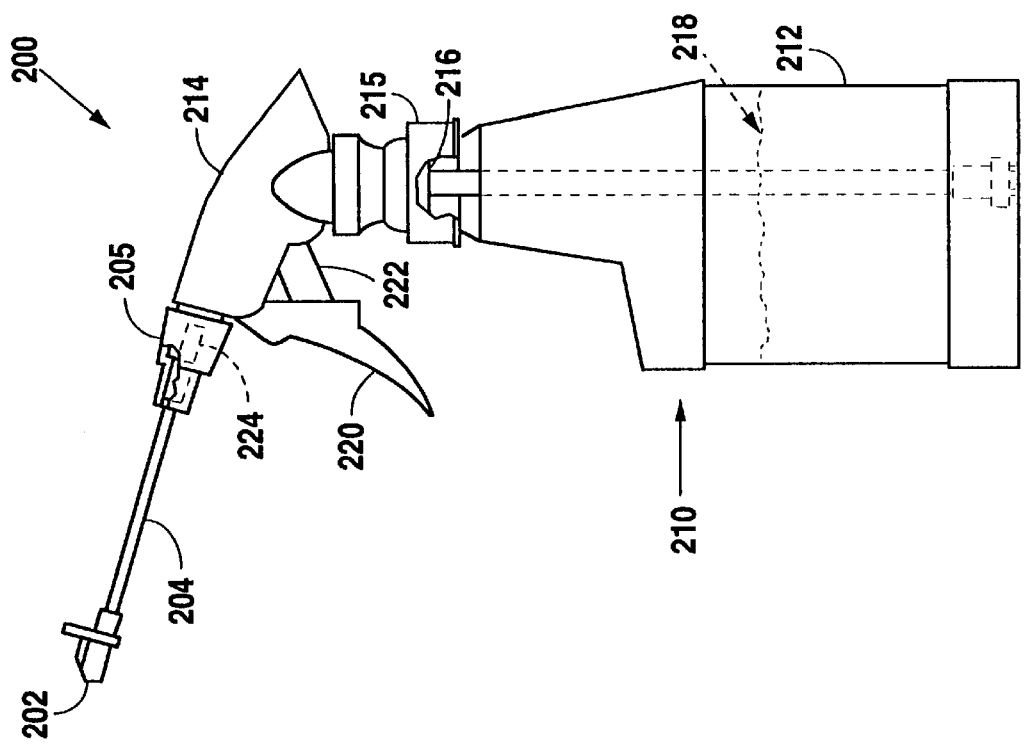
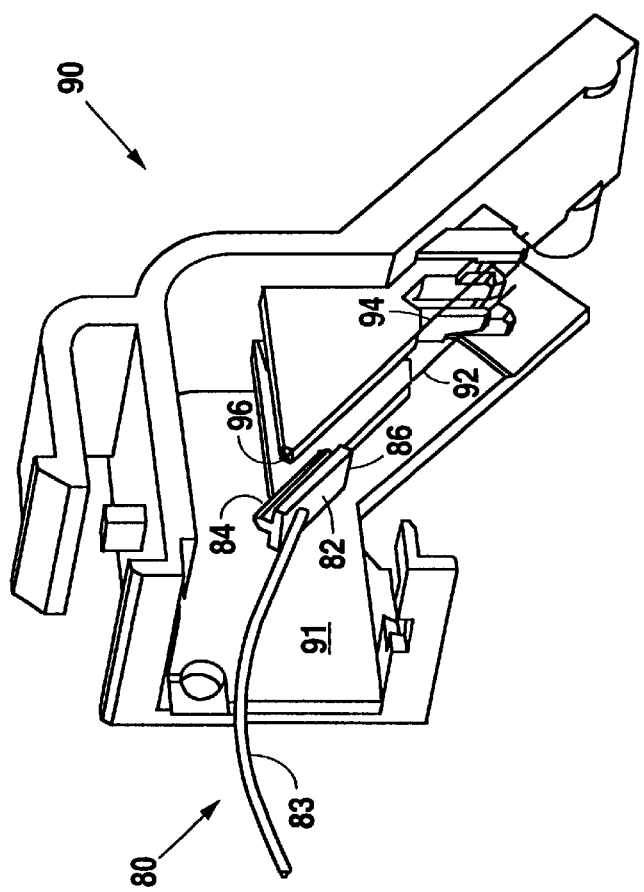
Fig. 11
Fig. 10

FIBER OPTIC CABLE CLEANER

CROSS-REFERENCE TO RELATED APPLICATIONS

This application is a continuation-in-part of U.S. patent application Ser. No. 08/660,644 now U.S. Pat. No. 5,836,031, filed on Jun. 7, 1996, of Larry R. Cox, et al., titled "Fiber Optic Cable Cleaner". This application is related to U.S. patent application Ser. No. 08/801,058, filed on Feb. 14, 1997, of Sidney J. Berglund, et al., titled "Fiber Optic Connector Spring", which related application is assigned to the assignee of the present invention and is hereby incorporated herein in its entirety by this reference thereto.

BACKGROUND OF THE INVENTION

The present invention generally relates to systems and methods for preparing the terminal ends of communications lines for interconnection and, more particularly, relates to such cleaners and methods for cleaning the end face of an optical fiber to be connected with another optical fiber or an optoelectronic device.

In optical fiber communications, it is important that the optical fibers provide exceptional optical transmission characteristics. Points of connection of optical fibers to other optical fibers or devices are particularly susceptible to conditions that distort or hamper optical capabilities. Also, the axes of optical fibers, particularly when the optical fibers are situated in grooves, are susceptible to the conditions. Optical characteristics are disturbed, for example, by dust, smoke, dirt, and other extraneous materials that become located on surfaces of the optical fibers, particularly the end faces of the fibers where optical connections are made and along the axes of fibers.

It has been shown that desirable fiber optic connections can be made using connector devices formed with fiber-alignment grooves. Examples of such devices and connections are disclosed in U.S. patent application Ser. No. 08/664,039, filed on Jul. 25, 1996, titled "Active Device Receptacle"; U.S. patent application Ser. No. 08/801,058 (Attorney Docket No. 53184USA3A) filed on Feb. 14, 1997, of Sidney J. Berglund, et al., titled "Fiber Optic Connector Spring"; and U.S. patent application Ser. No. 08/577,740, now U.S. Pat. No. 5,757,997 filed on Dec. 22, 1995, of Barbara L. Birrell, et al., titled "Optical Fiber Connector Using Fiber Spring Force and Alignment Groove". With such devices, optic fiber connections are made with bare fiber ends located and aligned in grooves, which are, for example, V-shaped grooves. An end of an optical fiber to be connected is placed into a groove, and the end progresses along the groove until the end face abuts the end face of another optical fiber or an optical sensor of an optoelectronic device. It is apparent that the optical transmission capabilities of the optical fiber will depend upon the suitability of the end face connection, among other factors.

Thus, the cleanliness of the optical fiber end face to be connected with an abutting end face of another optical fiber or optical device has great significance to the optical performance of the connection. If the optical fiber end face is covered with extraneous matter, light passing through the end face is distorted and/or restricted by the extraneous matter. Further, separation of fiber end face contact because of such matter causes unwanted reflection In this regard, U.S. patent application Ser. No. 08/660,644 (Attorney Docket No. 52353USA5A), filed on Jun. 7, 1996, of Larry R. Cox, et al., titled "Fiber Optic Cable Cleaner", provides a device for cleaning the tip of an optical fiber retained in a connector. It would be an advantage to provide other systems and methods for cleaning optical fiber end faces and axes in order to obtain desired optical performance by optical fiber connections. Other desirable advantages of such systems and methods could include that disassembly is not required to conduct the cleaning operations.

Therefore what is needed are systems and methods for cleaning the end faces of optical fibers, which end faces are contained within plugs and housings, such as those shown in the related applications and the other applications mentioned herein. Embodiments of the present invention provide such systems and methods for cleaning end faces of optical fibers to provide exceptional optical connection characteristics. The invention, thus, improves optical performance of optical fiber connections and simplifies cleaning operations.

SUMMARY OF THE INVENTION

The embodiments of the present invention, accordingly, provide systems and methods for cleaning end faces of optical fibers. The systems and methods provide advantages of improved optical performance of optical fiber connections made with those end faces and simplified cleaning operations without disassembly.

To this end, an embodiment of the invention is a device for cleaning an optical fiber. The device includes a body having a surface and a cleaning substance deposited on the surface. The body is selectively positionable for selectively contacting the cleaning substance with the optical fiber.

Another embodiment of the invention is a device for cleaning an optical fiber lodged in a fiber alignment groove. The device includes a body having a surface and cleaning substance deposited on the surface. the body is selectively configured to conform to the fiber alignment groove.

Yet another embodiment of the invention is a system for cleaning an optical fiber with a liquid. The system includes a liquid delivery unit and a nozzle attached to the liquid delivery unit. The nozzle is selectively positionable for selectively delivering the liquid onto the optical fiber.

Another embodiment of the invention is a system for cleaning an optical fiber with a liquid. The optical fiber is lodged in a fiber alignment groove of a socket. The system includes a liquid delivery unit and a nozzle attached to the liquid delivery unit. The nozzle is selectively configured to conform to the socket.

Yet another embodiment of the invention is a system for cleaning an optical fiber with a liquid. The optical fiber is maintained within a plug. The system includes a liquid delivery unit and a nozzle attached to the liquid delivery unit for accepting the plug and providing access to the optical fiber within the plug.

BRIEF DESCRIPTION OF THE DRAWINGS

FIG. 10 is a perspective view of the manual wedge cleaner of FIG. 9 with an attached handle, in use for cleaning an end face of an optical fiber contained within a groove of a socket, such socket being shown in partial cut-away in the Figure, according to embodiments of the present invention.

FIG. 11 is a side view of a spray cleaning system, according to embodiments of the present invention.

DETAILED DESCRIPTION OF THE PREFERRED EMBODIMENT

Reference is hereby made to the parent and related applications for details of optical fiber connectors, including plugs and sockets, wherein optical fiber connections are made in fiber-alignment grooves. Because details are given in those applications of the connectors, including the plugs and sockets, the plug and socket designs are not discussed herein in detail. The discussion herein focuses primarily on embodiments of systems and methods for cleaning end faces of optical fibers to be connected to other optical fibers or optoelectronic devices.

Figure 3:
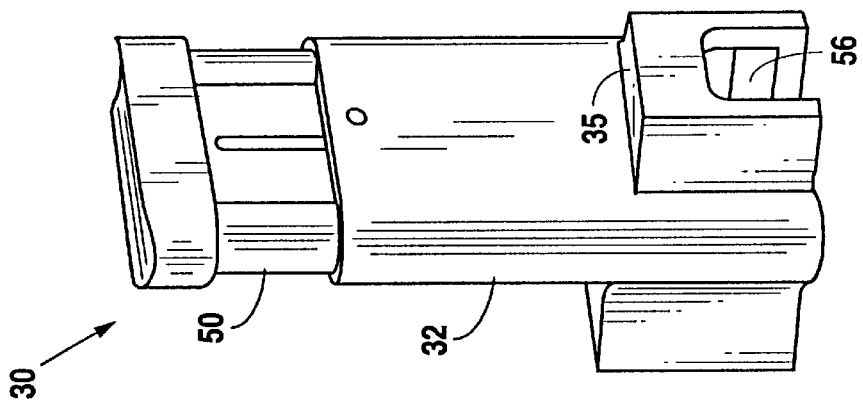
FIG. 3 is a rear perspective view of the plug fiber exposer tool of FIG. 2, according to embodiments of the present invention.
Figure 2:
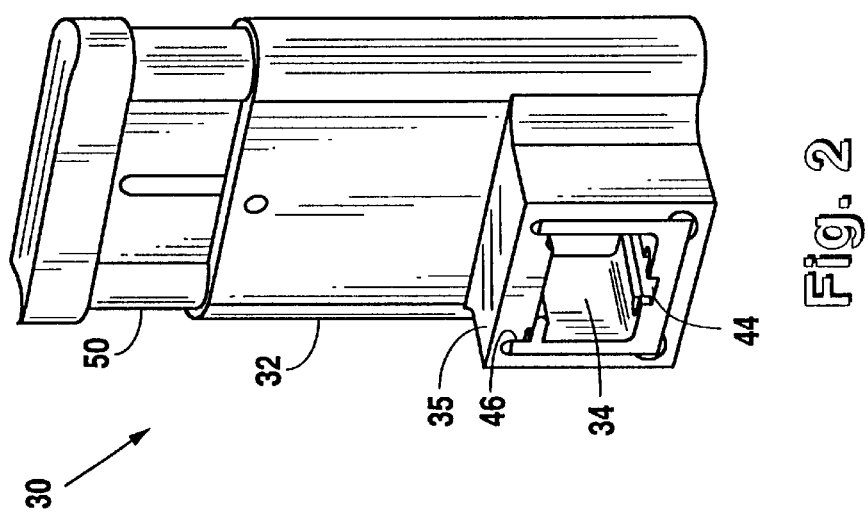
FIG. 2 is a front perspective view of a plug fiber exposer tool for exposing optical fibers contained within a plug and allowing access to the end faces of the optical fibers, such as for cleaning, according to embodiments of the present invention.
Figure 1:
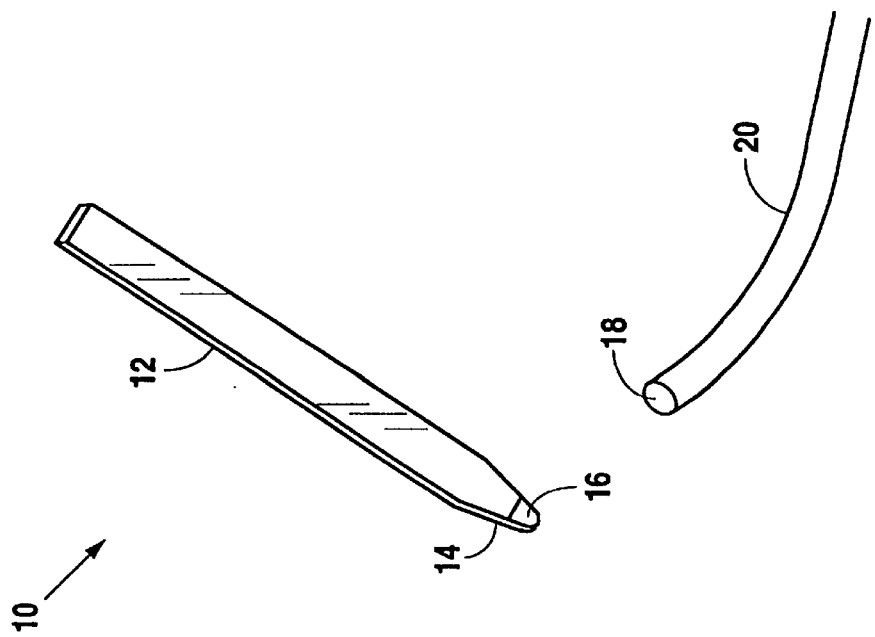
FIG. 1 is a perspective view of a manual strip cleaner having an adhesive on a tip thereof for cleaning an end face or along an axis of an optical fiber, according to embodiments of the present invention.
Figure 4:
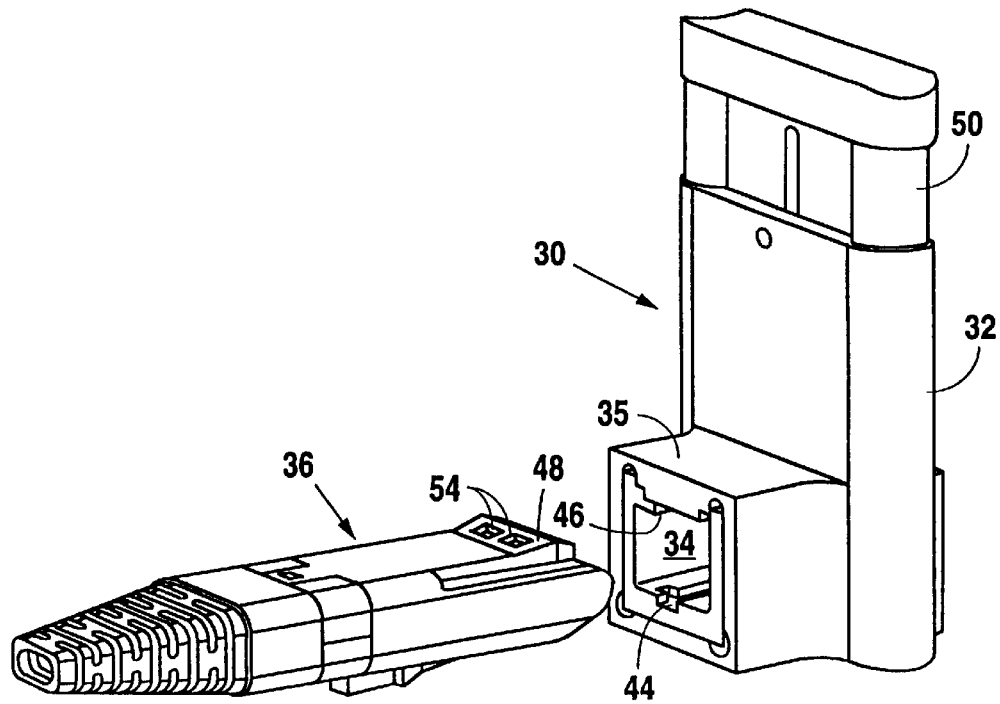
FIG. 4 is a front perspective view of the plug fiber exposer tool of FIG. 2 and a plug containing terminal ends of two optical fibers, according to embodiments of the present invention.
Figure 5:
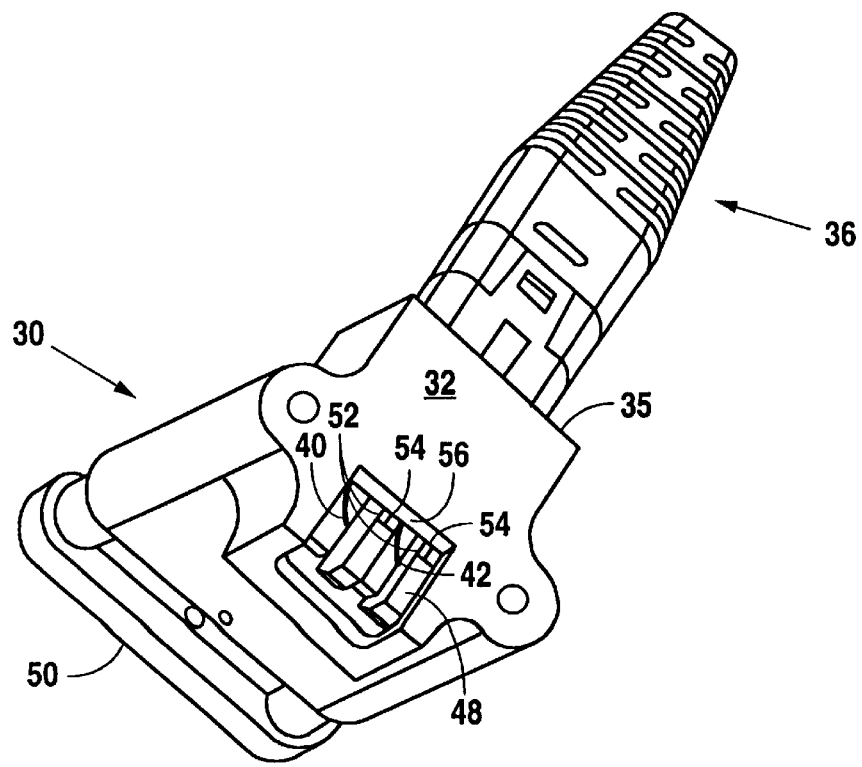
FIG. 5 is a bottom perspective view of the plug fiber exposer tool and the plug of FIG. 4, in use to expose the terminal ends of the two optical fibers contained in the plug, for example, for cleaning end faces of the optical fibers, according to embodiments of the present invention.

Referring to FIG. 1, a manual strip cleaner 10 includes a body 12 having a tip 14. The body 12 is a thin, slender strip. One end of the body 12 forms a tip 14, which narrows to a rounded point. A portion of the point at the tip 14 contains an adhesive coat 16 on one side of the body 12. The body 12 is formed of, for example, a 15 mil. Petg (i.e., poly(ethylene teraphthalate)glycol comonomer) available from Plitek of Des Plaines, Ill., or some other thin, semi-rigid plastic, metal, or other material. The adhesive coat 16 is an adhesive, for example, an acrylic adhesive, such as the Model 3M966™ adhesive available from the Minnesota Mining and Manufacturing Company, St. Paul, Minn. (3M), or some other adherent or cleaning substance. The adhesive coat 16 is located only on one surface of the tip 14.

In operation, the manual strip cleaner 10 is used to clean an end face 18 or along an axis of an optical fiber 20. To clean the end face 18, the tip 14 of the manual strip cleaner is directed toward the end face 18 with the adhesive coat 16 oriented toward the end face 18. The adhesive coat 16 at the tip 14 is placed against the end face 18 of the optical fiber 20, for example, at an angle of about 90° to the axis of the optical fiber 20. As the adhesive coat 16 touches the end face 18, extraneous material, such as dirt, dust, smoke, or other debris or matter, adheres with the adhesive coat 16. The adhesive coat 16 of the tip 14 may be contacted with the end face 18 one or more times to ensure that the end face 18 is clean. After so cleaning the end face 18, the end face 18 may be examined through a microscope or other optical device to ensure that extraneous material has been desirably removed from the end face 18. The end face 18 so cleaned provides preferable optical connection characteristics. The optical fiber 20 is cleaned along its axis in similar manner by contacting the adhesive coat 16 with the optical fiber 20 circumference along the length.

Referring to FIGS. 2–5, in conjunction, a plug fiber exposer tool 30 includes a tool body 32 having an opening 34 within a socket portion 35. The opening 34 is suitable to accommodate a plug 36 (FIGS. 4 and 5) of the type accommodating first and second optical fibers 40 and 42, respectively, described in the parent and related applications. The socket 35 is formed at the opening 34 with guide features 44 to ensure that the plug 36 is appropriately oriented and retained in the body tool 32. A camming surface 46 is provided to slidingly move a door 48 of the plug 36 as the plug 36 is inserted, so that the first and second optical fibers 40 and 42 contained within the plug 36 are accessible.

The tool body 32 also includes an access opening 56 which meets the opening 34 within the tool body 32.

The plug fiber exposer tool 30 includes an actuation member 50. The actuation member 50 slides within the tool body 32. Springs (not shown) tend to push the actuation member 50 away from the tool body 32 (i.e., upward in FIGS. 2–3) when not actuated by downward force to overcome the spring forces, however, the actuation member 50 is retained within the tool body 32 by the tool body 32. The actuation member 50 includes push rods 52 (also shown in FIG. 6) which serve to pass through holes 54 on the door 48 of the plug 36 on actuation, when the plug 36 is inserted in the opening 34 thereby sliding the door 48 to reveal the first and second optical fibers 40 and 42. The push rods 52, when so passed through the holes 54, contact and push the first and second optical fibers 40 and 42 away from the plug 36 to expose the end faces of the optical fiber 40 and 42 in the access opening 56 of the tool body 32.

The tool 30 may, for example, be machined from plastic, metal or other materials, to provide the various features.

In operation, the plug 36 is properly oriented via the guide features 44 and pressed into the opening 34. When fully inserted in the opening 34, the plug 36 is located with the door 48 slid away from the holes 54 to expose the first and second optical fibers 40 and 42. The holes 54 are thereby aligned with the push rods 52, so that the push rods 52 pass into and through the holes 54 when the actuation member 50 is pressed and slid into the tool body 32. The first and second optical fibers 40 and 42 are pushed by the push rods 52 as those rods 52 pass through the holes 54. The push rods 52 lift the first and second optical fibers 40 and 42 from the plug 36 and expose the end faces of the first and second optical fibers 40 and 42 within the access opening 56. The end faces of the first and second optical fibers 40 and 42, as so exposed, are accessed for cleaning or other purposes.

For example, using the manual strip cleaner 10 of FIG. 1, the tip 14 of the manual strip cleaner 10 is positioned in the access opening 56 with the adhesive coat 16 directed toward the end face of one of the first or second optical fibers 40 or 42. Because the first and second optical fibers 40 and 42 are exposed and lifted from the plug 36 within the access opening 56, the adhesive coat 16 of the tip 14 may be contacted with one of the end faces, for example, at an angle of about 90° to the axis. That contact causes extraneous material at the end face to adhere to the adhesive coat 16 and be removed from the end face as the manual strip cleaner 10 is moved away from that contact. End faces of the first and second optical fibers 40 and 42 may, thus, be cleaned using the plug fiber exposer tool 30 in this manner. Similarly, other cleaning devices, substances, and processes, for example, solvent sprays as later described, may be employed in conjunction with the plug fiber exposer tool 30 with similar advantages of exposing the end faces of the optical fibers for accessibility thereto for cleaning.

Figure 6:
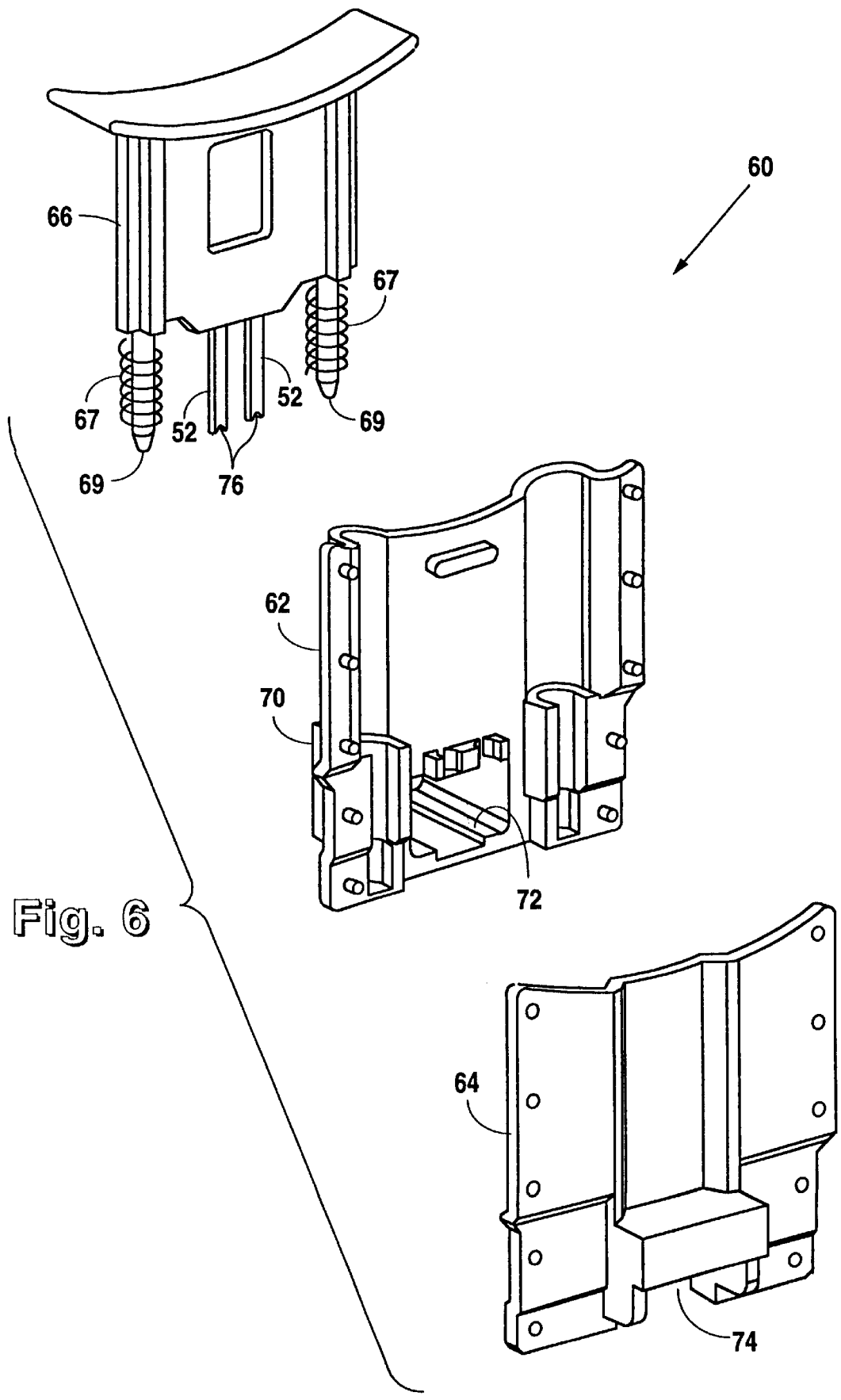
FIG. 6 is an rear, exploded, perspective view of an alternative plug fiber exposer tool that is injection moldable, according to embodiments of the present invention.
Figure 7:
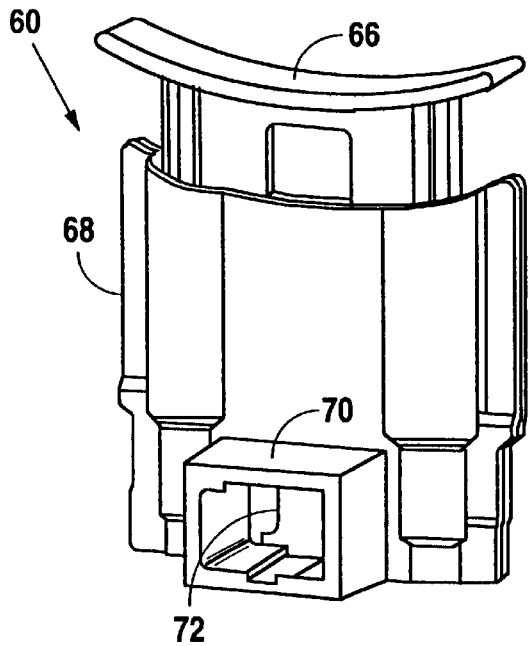
FIG. 7 is a front perspective view of the alternative plug fiber exposer tool of FIG. 6, according to embodiments of the present invention.
Figure 8:
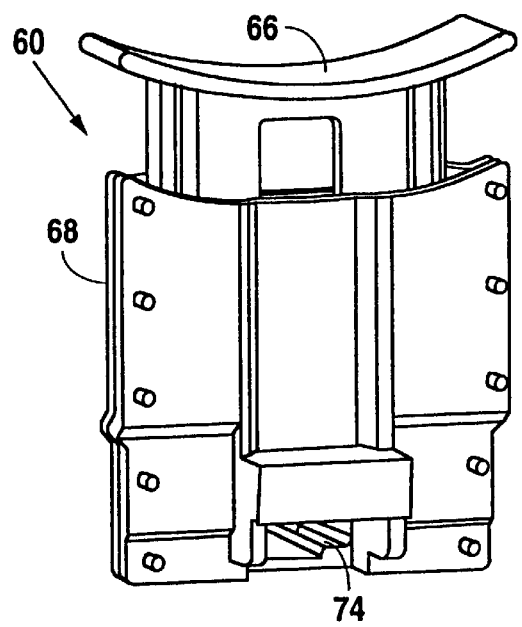
FIG. 8 is a rear perspective view of the alternative plug fiber exposer tool of FIG. 6, according to embodiments of the present invention.

Referring to FIGS. 6–8, in conjunction, an alternative plug fiber exposer tool 60 includes a front body piece 62, a rear body piece 64, and an actuation member 66. The front body piece 62 and the rear body piece 64 are joinable to form a tool body 68. The front body piece includes a socket 70 with an opening 72. The rear body piece 64 includes an access opening 74. The tool body 68, with the socket 70, the opening 72, and the access opening 74, is substantially similar to and functions substantially the same as the tool body 32 of FIGS. 2–5.

The alternative plug fiber exposer tool 60 also includes the actuation member 66. Springs 67 (shown in FIG. 6) tend to push the actuation member 66 away from the tool body 68. The springs are positioned on guides 69 and contact the tool body 68 when the actuation member 66 is positioned in the tool body 68. The actuation member 66 includes posts 52. The posts 52 have grooved tips 76. The actuation member 66 is substantially similar to and functions substantially the same as the actuation member 50 of FIGS. 2–5. When the actuation member 66 is pressed into the tool body 68 overcoming the spring 67 forces, the posts 52 pass through holes of an optical fiber plug placed in the opening 72, the optical fibers contained in the optical fiber plug become captured in respective ones of the grooved tips 76, and the optical fibers are raised from the plug and exposed for access through the access opening 74, all as previously described.

The alternative plug fiber exposer tool 60, thus, may serve to expose optical fibers contained within a plug, for example, to allow access to clean the end faces of the optical fiber. The tool 60 may, for example, be formed of injection molded plastic, metal or other materials, to provide the various features.

Figure 9:
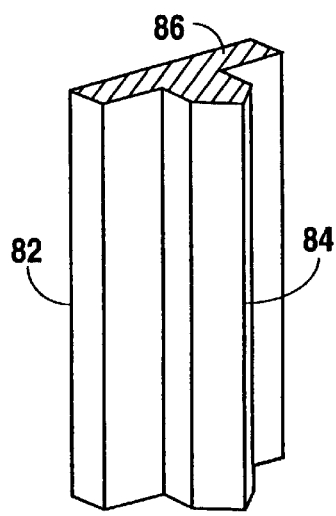
FIG. 9 is a perspective view of a manual wedge cleaner having an adhesive on an end thereof for cleaning an end face of an optical fiber contained within a groove, for example, a V-shaped groove, according to embodiments of the present invention.
Figure 12:
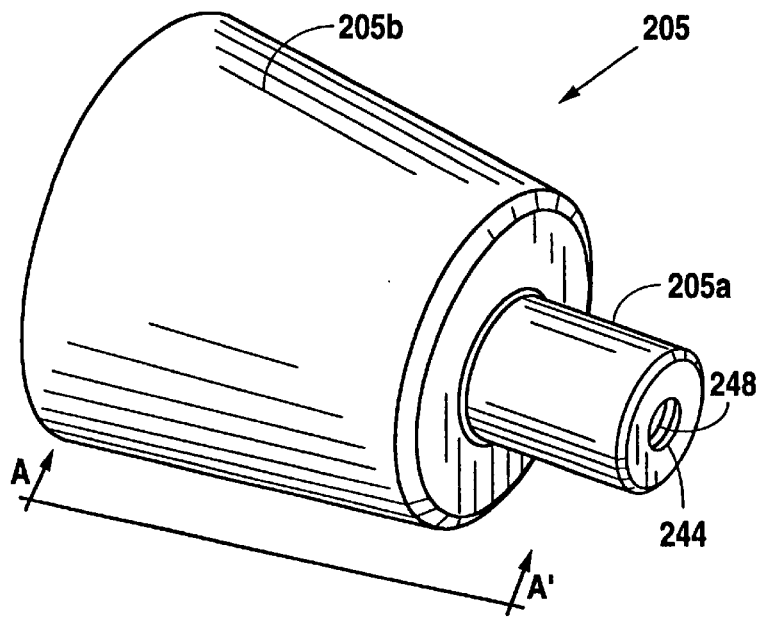
FIG. 12 is a perspective view of an outlet nozzle of the spray cleaning system of FIG. 11, according to embodiments of the present invention.
Figure 13:
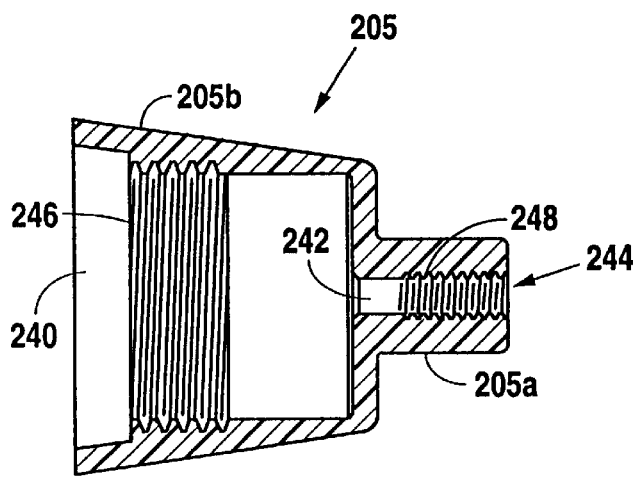
FIG. 13 is a side, cross-sectional view along line A–A' of the outlet nozzle of FIG. 12, according to embodiments of the present invention.
Figure 14:
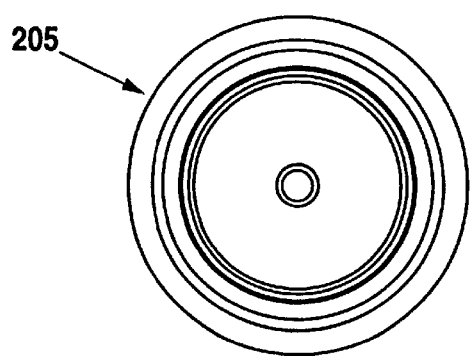
FIG. 14 is a rear view of the outlet nozzle of FIG. 12, according to embodiments of the present invention.
Figure 15:
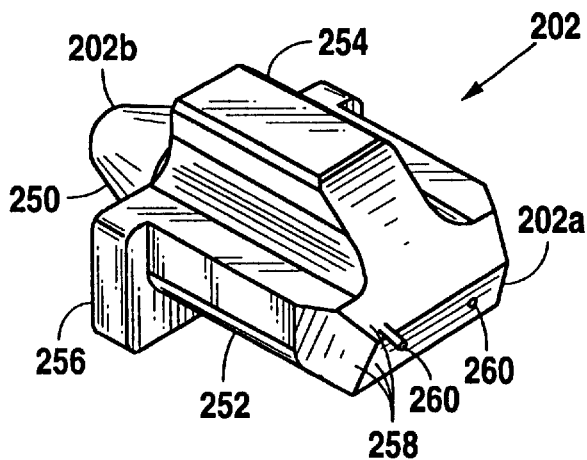
FIG. 15 is a perspective view of a dual port discharge head of the spray cleaning system of FIG. 11, according to embodiments of the present invention.
Figure 16:
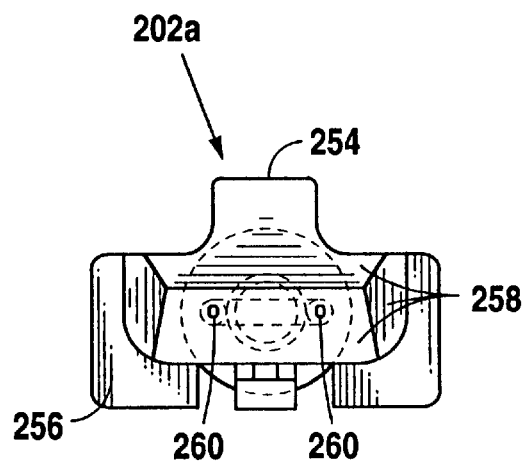
FIG. 16 is a front view of the dual port discharge head of FIG. 15, according to embodiments of the present invention.
Figure 17:
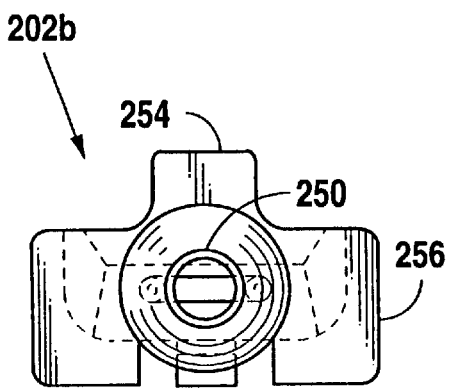
FIG. 17 is a rear view of the dual port discharge head of FIG. 15, according to embodiments of the present invention.
Figure 18:
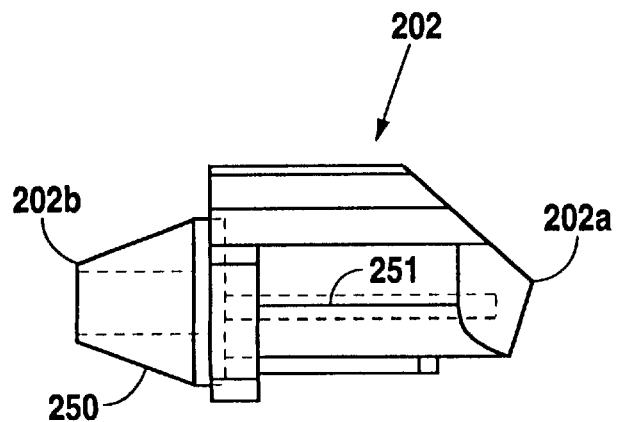
FIG. 18 is a side view of the dual port discharge head of FIG. 15, according to embodiments of the present invention.
Figure 19:
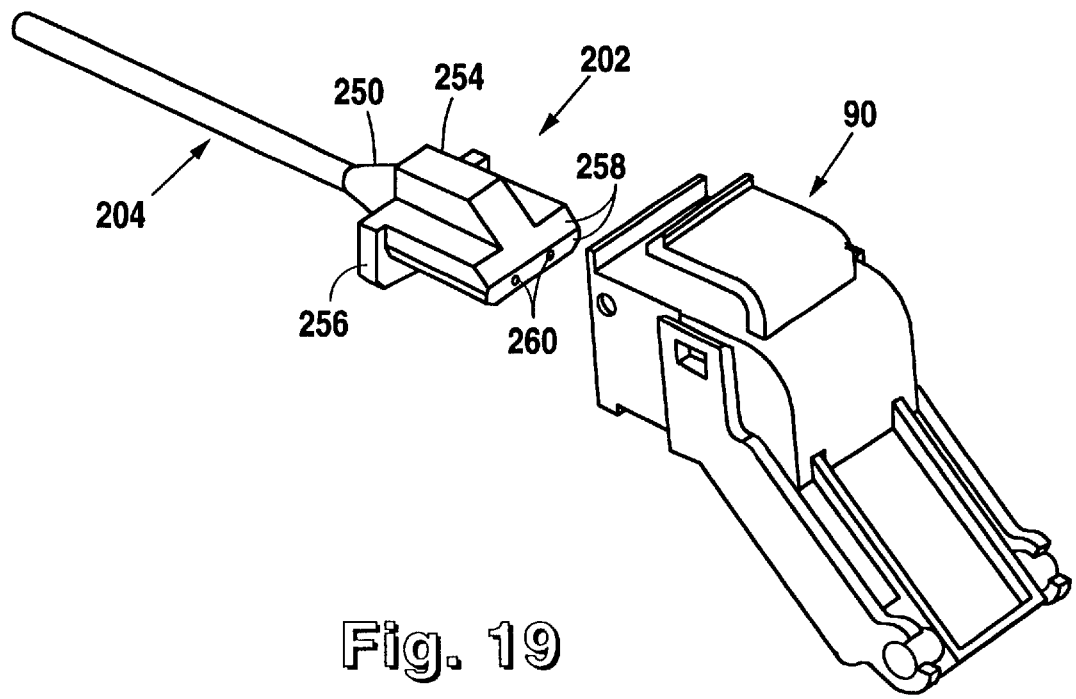
FIG. 19 is a perspective view of the dual port discharge head of FIG. 15 equipped with an extension tube and being introduced into an optical fiber socket, according to embodiments of the present invention.
Figure 20:
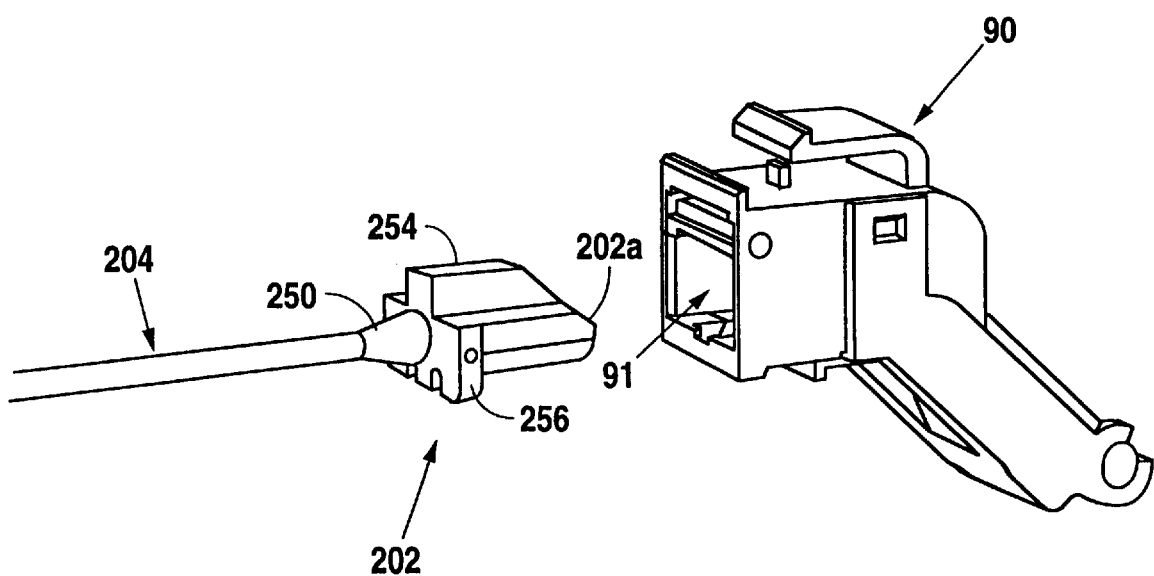
FIG. 20 is a perspective view of the dual port discharge head of FIG. 15 equipped with the extension tube and being introduced into the optical fiber socket, according to embodiments of the present invention.
Figure 21:
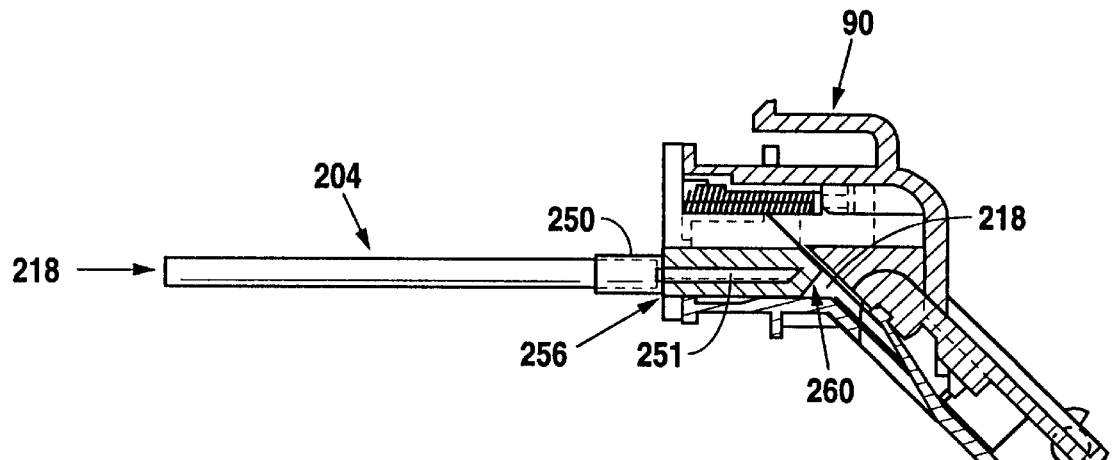
FIG. 21 is a side, cross-sectional view of the dual port discharge head of FIG. 15, with attached extension tube, located in the optical fiber socket, according to embodiments of the present invention.

Referring to FIGS. 9–10, in conjunction, a manual wedge cleaner 80 includes a wedge head 82 and a handle 83. The wedge head 82 is a generally flat and square-shaped block with a raised arch 84 running along a length of the block. The raised arch 84 includes an inverted V-shaped apex. An end of the wedge head 82 is coated with an adhesive coat 86. The adhesive coat 86 is an adhesive, for example, an acrylic adhesive, such as the Model 3M966™ adhesive available from the Minnesota Mining and Manufacturing Company, St. Paul, Minn. (3M), or some other adherent or cleaning substance. The adhesive coat 86 is located only on the end surface of the wedge head 82.

The handle 83 is attached to a surface of the wedge head 82, for example, opposite the surface with the raised arch 84. The handle 83 is angled in relation to the surface to which attached, for example, at an angle of from about 0° to about 90°. The handle 83 is dowel-shaped or, alternatively, may have a rectangular, triangular or other cross-section. The handle 83 is sufficiently long to provide manipulation of the wedge head 82 within an enclosure, for example, an optical fiber socket 90, when the handle 83 is outside the enclosure. The handle 83 is also semi-flexible so that a user can flex the handle 83 when directing the wedge head 82 against a surface, such as a V-shaped groove, in order to maintain a desired force against the surface in contact with the wedge head 82. In any event, the adhesive coat 86 on the end surface of the wedge head 82 serves the same purpose of the tip 14 of the manual strip cleaner 10 of FIG. 1, that is, the adhesive coat 86 is contactable with an end face of an optical fiber to clean the end face of extraneous materials.

In operation, the manual wedge cleaner 80 cleans the end face of an optical fiber, for example, the optical fiber 92 contained within the socket 90, and or cleans a fiber alignment groove 96, such as a V-shaped groove, in which a fiber end face optical connection is to be made. To clean the end face, the end of the manual wedge cleaner 80 is directed toward the end face of the optical fiber 92 with the adhesive coat 86 oriented toward the end face. The adhesive coat 86 is placed against the end face of the optical fiber 92. As the adhesive coat 86 touches the end face, extraneous material, such as dirt, dust, smoke, or other debris or matter, adheres with the adhesive coat 86. The adhesive coat 86 may be contacted with the end face one or more times to ensure that the end face is clean. After so cleaning the end face, the end face may be examined through a microscope or other optical device to ensure that extraneous material has been desirably removed from the end face. The end face so cleaned provides preferable optical connection characteristics.

The raised arch 84 of the manual wedge cleaner 80 is of particular note in that it is sized to fit within the fiber alignment groove 96 or another fiber alignment groove. In FIG. 10, the manual wedge cleaner 80 is used to clean the optical fiber 92 within the fiber alignment groove of the socket 90. The socket 90 is of the type accommodating first and second optical fibers 92 and 94, respectively, described in the parent and related applications. The socket 90 includes the fiber alignment grooves in which connections of the first and second optical fibers 92 and 94 are to be made. As described in the parent and related applications, the socket 90 includes a door (not shown) which must be entered to access the fiber alignment grooves and the first and second optical fibers 92 and 94. The handle 83 allows the wedge head 82 to be selectively positioned within the socket 90 in one of the fiber alignment grooves in order to contact the adhesive coat 86 with the end face of the optical fiber 92 or 94. A semi-rigid, flexible material for the handle 83 will allow pressure to be applied with the wedge head 82 within the fiber alignment groove if that is desired in the application.

Referring to FIG. 11, a spray cleaning system 200 includes a dual port discharge head 202 equipped with an extension tube 204 and an outlet nozzle 205. The spray cleaning system 200 also includes a conventional spray bottle assembly 210. The conventional spray bottle assembly 210 includes a solvent bottle 212, for example, a polyethylene bottle identified as Model No. 53008, sold by Lerman Container Company, of Naugatuck, Conn. The solvent bottle 212 is fitted with a spray head 214, such as a spray head of the type sold by The Afa Corporation of Forest City, North Carolina, Model No. 8710AT. The spray head 214 has a connector 215 with internal threadings. The internal threadings correspond to external threadings of the opening of the solvent bottle 212. The spray head 214 includes a feed tube 216 that extends from the connector 215 of the spray head 214 into the solvent bottle 212 and the liquid contents 218 thereof. A handle 220 and piston 222 of the spray head 214 is operable by squeezing to cause the liquid contents 218 to be drawn into the feed tube 216, through the spray head 214 and out a spout 224 of the spray head 214.

Referring to FIGS. 11–14, the outlet nozzle 205 of the spray cleaning system 200 is of particular note in that it is specially designed to open and close the spout 224 to selectively allow or prevent passage of the liquid contents from the solvent bottle 212 and spray head 214 assembly. The outlet nozzle 205 is a generally frusto-conically shaped, hollow piece, with a forepart 205a and aftpart 205b. The aftpart 205b forms a larger hollow chamber 240. The forepart 205a forms a smaller hollow chamber 242 that connects with the larger hollow chamber 240 and includes an outlet 244. The larger hollow chamber 240 has internal threadings 246 that correspond to threadings contained on the spout 224 of the spray head 214. Internal threadings 248 are also contained in the smaller hollow chamber 242. The larger hollow chamber 240 is screwable onto the spout 224.

Referring to FIGS. 11 and 15–18, the dual port discharge head 202 has an outlet end 202a and an inlet end 202b. The inlet end 202b includes a coupling 250 that is hollow with internal threads. The coupling 250 is connected with a body 252. The body 252 is formed with a stop 256 and a guide 254. The outlet end 202a includes various beveled surfaces 258. Outlet ports 260 are formed at the outlet end 202a. The outlet ports 260 are connected with the hollow interior of the coupling 250 by channels 251 (shown in phantom in FIG. 18).

Referring to FIGS. 11 and 15–21, the dual port discharge head 202 is connected to the extension tube 204 which is connected to the outlet nozzle 205. The outlet nozzle 205, as previously mentioned, mates with the spray head 214. External threadings are formed at each end of the extension tube 204 when the extension tube 204 is screwed into the internal threadings of the coupling 250 and the internal threadings of the smaller hollow chamber 242 at the outlet 244. All threaded seals, as well as the spray head 214 and solvent bottle 212 assembly, are liquid tight, so that the liquid contents 218 of the solvent bottle 212 will only pass from the solvent bottle 212 through the spray head 214 and out the outlet nozzle 205, extension tube 204, and dual port discharge head 202 assembly. The outlet nozzle 205, when screwed tight with the spray head 214, prevents the liquid contents from passing from the spray head 214. However, when the outlet nozzle 205 is rotated, for example, one-half turn, the liquid contents 218 pass out the outlet nozzle 205, the extension tube 204, and the dual port discharge head 202 when the handle 220 is squeezed.

In operation, the dual port discharge head 202 fits within the opening 91 of the socket 90. As previously mentioned, the socket 90 is described in greater detail in the parent and related applications. When the dual port discharge head 202, equipped as part of the spray cleaning system 200, is inserted in the opening 91, each of the outlet ports 260 aligns directly with the fiber alignment grooves and, thus, optical fibers positioned within those fiber alignment grooves, contained in the socket 90. The liquid contents 218 may be any of a variety of liquid cleaners or solvents that serve to clean extraneous material from optical fibers, for example, at their end faces or along the fiber axes, and the socket 90, such as a hydrofluoroether like HFE-7100™ solvent cleaning solution available from 3M. By squeezing the handle 220, the piston 222, which contains a portion of the liquid contents, forces the liquid contents 218 out the piston 222 and the spray head 214 because of a check valve of the spray head 214. The liquid contents 218 then pass through the outlet nozzle 205, the extension tube 204, and the dual port discharge head 202 and wet the optical fibers or other matters in aligned position with the outlet ports 260. In this manner, solvent or cleaner is placed in select locations, such as end faces of optical fibers, to provide cleaning. When the handle 220 is allowed to return to its unsqueezed position (returns to position by spring or other force), the piston 222 draws another portion of the liquid contents 218 into the piston 222 by vacuum for further actuation of the piston 222 and spray expression.

Figure 22:
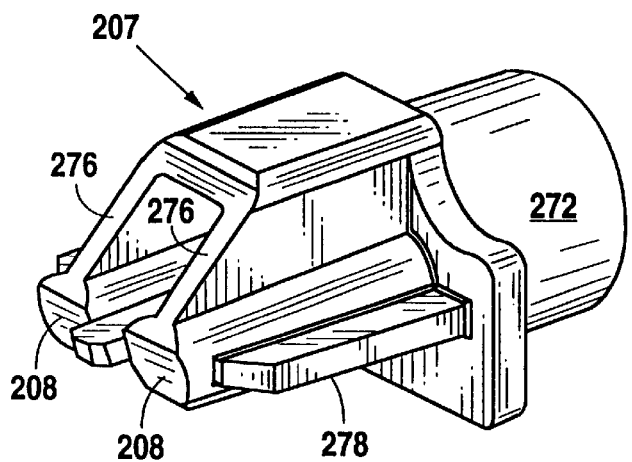
FIG. 22 is a front perspective view of an injection moldable dual port discharge head according to embodiments of the present invention.
Figure 23:
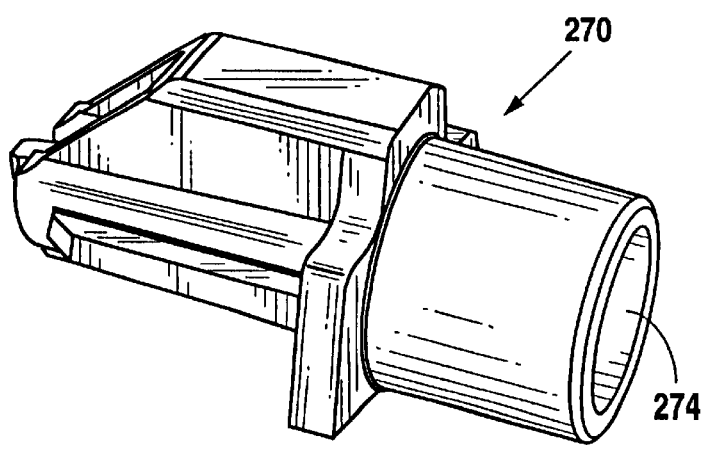
FIG. 23 is a rear perspective view of the injection moldable dual port discharge head of FIG. 22, according to embodiments of the present invention.

Referring to FIGS. 22 and 23, an alternative dual port discharge head 270 includes a coupling 272 sufficient to accommodate the extension tube 204. The coupling 272 includes internal threads for screwing engagement of the discharge head 270 with the extension tube 204. The discharge head 270 is formed with door guides 276 at an end opposite the coupling 272. The door guides 276 and body portions 278 of the discharge head 270 are shaped to fit within the opening 91 of the socket 90 (shown in FIGS. 19–21), in similar manner to that described above with respect to the dual port discharge head 202.

In operation, the alternative dual port discharge head 270 functions substantially the same as the dual port discharge head 202.

Figure 24:
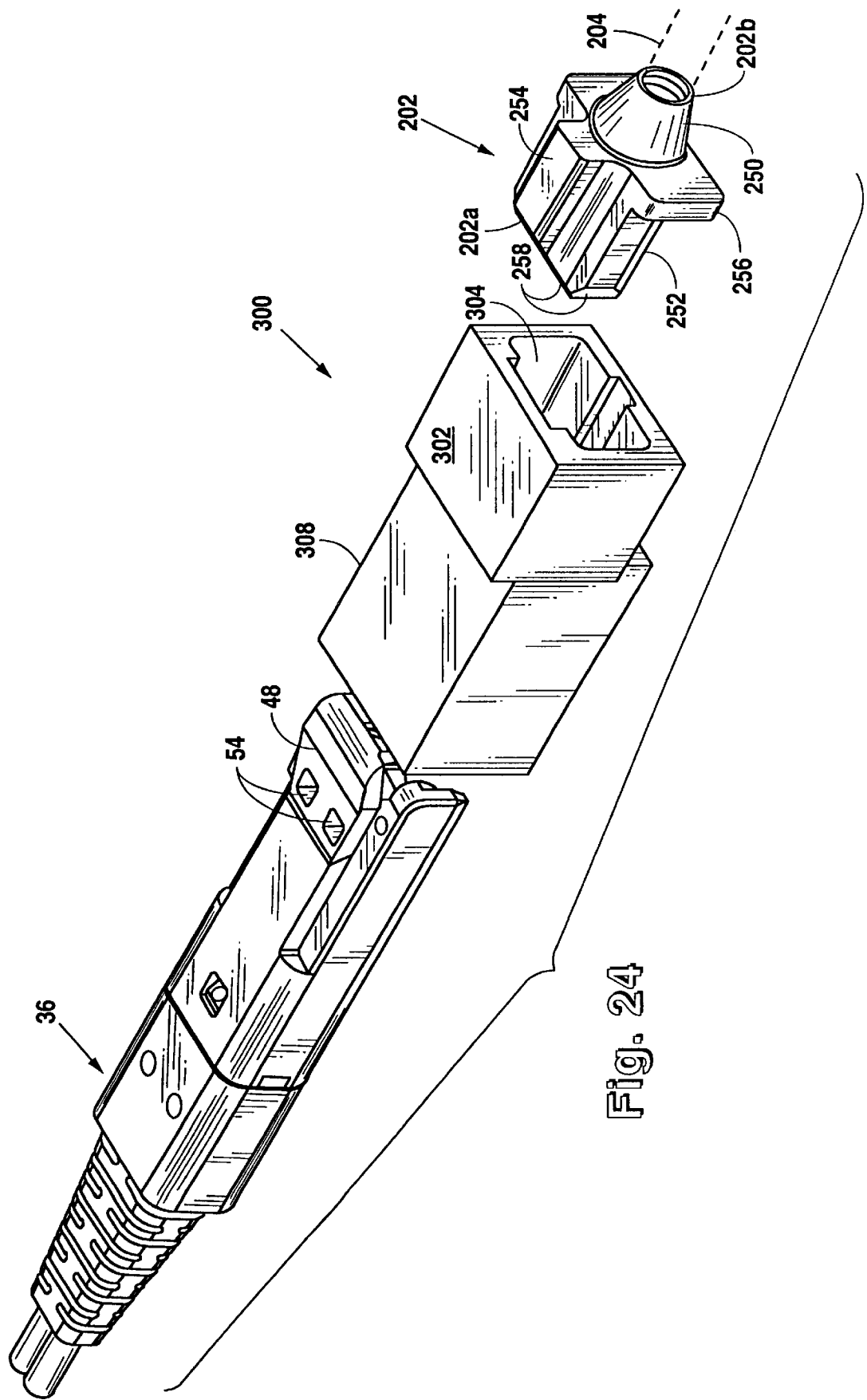
FIG. 24 is a perspective view of a plug dual port adapter, and dual port discharge head and plug, according to embodiments of the present invention.
Figure 25:
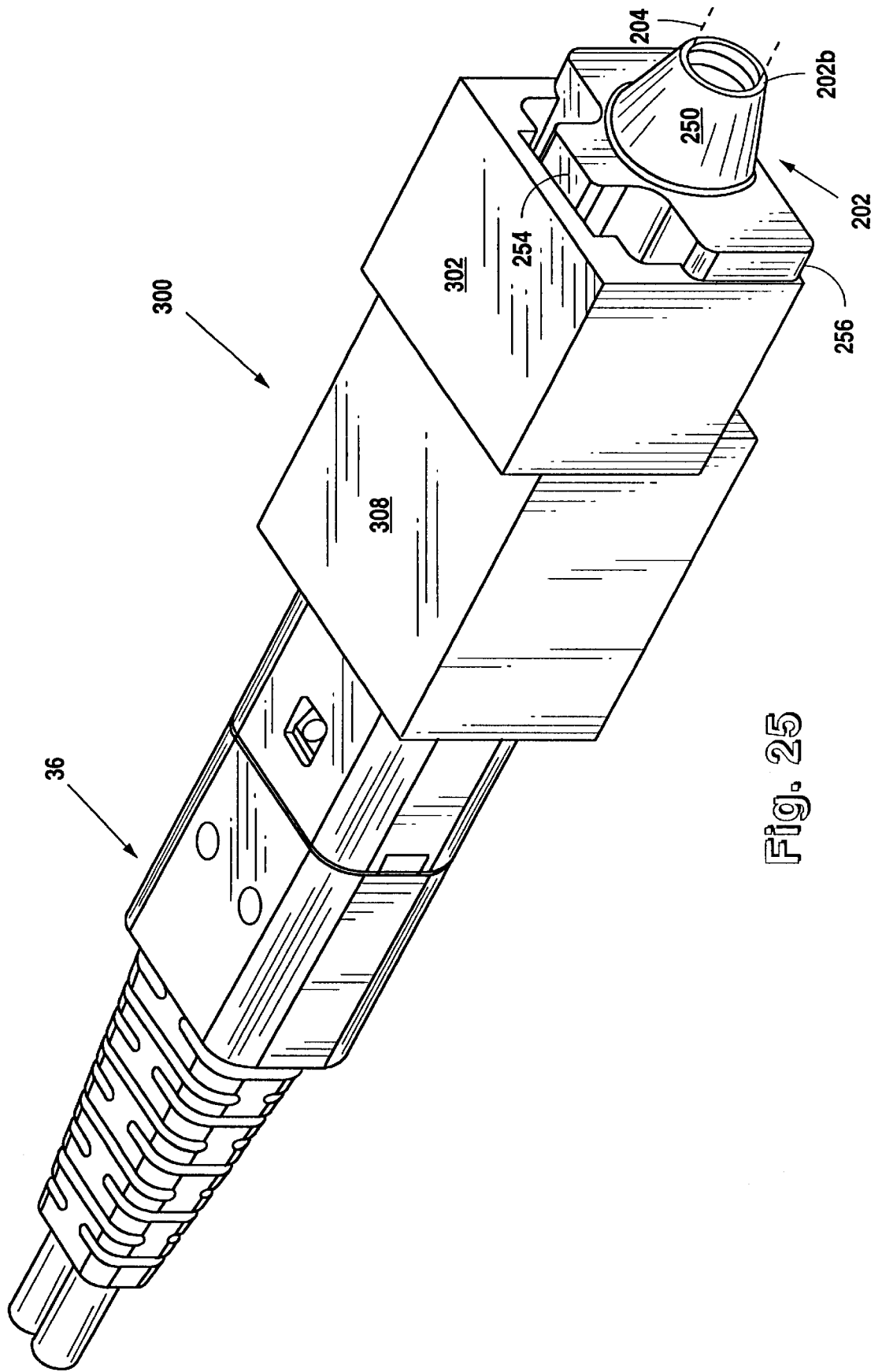
FIG. 25 is a perspective view of the plug dual port adapter of FIG. 24, in use with the dual port discharge head and the plug, according to embodiments of the present invention.
Figure 26:
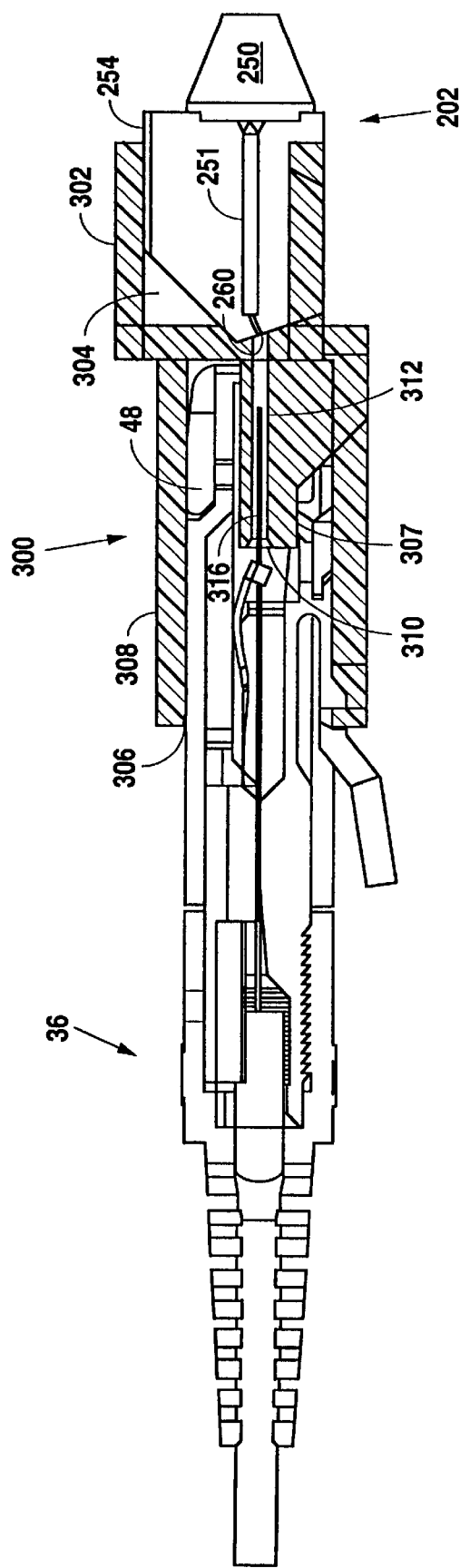
FIG. 26 is a side, cross-sectional view of the plug dual port adapter, the dual port discharge head, and the plug of FIG. 25, as in use, according to embodiments of the present invention.

Referring to FIGS. 24–26, in conjunction with a plug dual port adapter 300 includes an entry socket 302 forming a hole 304 of sufficient size to accommodate the dual port discharge head 202. The plug dual port adapter 300 is formed with door guides 306 adjacent the entry socket 302 within the adapter 300. The door guides 306 and body portions 308 of the adapter 300 are shaped to mate with the optical fiber plug 36 (also shown in FIGS. 4 and 5 and in the parent and related applications) in such manner that the door 48 of the plug 36 slides to allow access to optical fibers 316 contained within the plug 36. The plug dual port adapter 300 includes port holes 310 and internal fluid passages 312 of a rib 307 of the adapter 300. The port holes 310 connect by the internal fluid passages 312 with the hole 304 and align with the outlet ports 260 of the dual port discharge head 202. The rib 307 of the adapter 300 fits in the slot of the door 48 and accepts the optical fibers 316 respectively into the port holes 310 and internal fluid passages 314 of the rib 307.

In operation, the dual port discharge head 202 of the spray cleaning system 200 is placed in the hole 304. This aligns the outlet ports 260 of the dual port discharge head 202 with the internal fluid passages 312 and, thus, the port holes 310 of the plug dual port discharge head 300. A plug 36 is mated with the door guides 306 and other features of the body portions 308 of the plug dual port discharge head 300. Squeezing the handle 220 then actuates the spray cleaning system 200, causing liquid contents 218 to flow out the port holes 310. Because the port holes 310 are aligned with optical fibers 316 contained in the plug 36, the liquid contents are selectively dispersed onto the optical fibers 316, for example, at the end faces and along the axes thereof contained within the internal fluid passages 314. This effects cleaning of the optical fiber end faces and outer surface. manual wedge cleaner are possible. One possible variation in configuration is to form those cleaners in particular shapes that fit specifically within desired spaces, for example, grooves, with certain alignment and positioning that provides desired contact of adhesive with the end face or other surface to be cleaned. Of course, with respect to the liquid cleaner or solvent embodiments, multiple additional ports or even fewer ports could be provided for the particular application. Materials, solvents, cleaners, adhesives, and other aspects may also be widely varied.

Although illustrative embodiments of the invention have been shown and described, a wide range of modification, change, and substitution is contemplated in the foregoing disclosure and, in some instances, some features of the present invention may be employed without a corresponding use of the other features. Accordingly, it is appropriate that the appended claims be construed broadly and in a manner consistent with the scope of the invention.

What is claimed is:

1. An optical fiber connector in combination with a cleaning device for cleaning the terminal end of an optical fiber disposed within said connector, said combination comprising:
    an optical fiber connector equipped with a fiber alignment groove, said alignment groove having the terminal end of an optical fiber disposed therein; and
    a cleaning device for cleaning the terminal end of said optical fiber, said cleaning device comprising (a) a nozzle adapted to dispense a cleaning solution, and (b) a housing equipped with first and second ports, said first port adapted to releasably engage said connector and said second port adapted to releasably engage said nozzle in an orientation such that said nozzle is directed at the terminal end of said optical fiber.

2. The combination of claim 1, wherein said nozzle is equipped with a resilient tab, and wherein said second port is adapted to releasably engage said tab when said nozzle is inserted into said second port.

3. The combination of claim 1, wherein said nozzle dispenses cleaning solution along a first axis, and wherein said second port releasably engages said nozzle in an orientation such that said first axis is essentially parallel to said alignment groove.

4. The combination of claim 1, wherein said nozzle dispenses cleaning solution along a first axis, and wherein said second port releasably engages said nozzle in an orientation such that the terminal end of said optical fiber is aligned with said first axis.

5. The combination of claim 1, wherein said optical fiber connector is equipped with first and second fiber alignment grooves having the terminal ends of first and second optical fibers disposed therein, wherein said nozzle has first and second ejection ports through which the cleaning solution is dispensed, wherein said first ejection port is adapted to dispense cleaning solution onto the terminal end of said first optical fiber, and wherein said second ejection port is adapted to dispense cleaning solution onto the terminal end of said second optical fiber.

6. The combination of claim 1, wherein said nozzle is connected to a piston actuated spray bottle.

7. The combination of claim 6, wherein said nozzle is connected to the piston actuated spray bottle by way of a longitudinal tube.

8. The combination of claim 1, wherein said second port has an interior surface which is essentially complimentary in shape to the cross-sectional profile of said nozzle.

9. The combination of claim 1, wherein said first and second ports have longitudinal axes that intersect at an angle $\phi$, and wherein said nozzle is adapted to dispense cleaning solution along a first axis which is set at an angle $\phi$ from the longitudinal axis of said nozzle.

10. The combination of claim 1, wherein said nozzle has a beveled surface.

11. The combination of claim 1, wherein said second port is equipped with a longitudinal slot, and wherein said nozzle is equipped with a longitudinal protrusion which mates with said slot.

12. The combination of claim 1, wherein said second port is equipped with at least one longitudinal slot, and wherein said nozzle is equipped with at least one lateral protrusion which mates with said at least one slot.

13. The combination of claim 12, wherein said second port is equipped with a plurality of longitudinal slots, and wherein said nozzle is equipped with a plurality of lateral protrusions which mate with said slots.

14. The combination of claim 1, wherein said nozzle is equipped with a plate which arrests the progression of said nozzle into said second port.

15. An optical fiber connector in combination with a cleaning device for cleaning the terminal end of an optical fiber disposed within said connector, said combination comprising:
    an optical fiber connector equipped with a fiber alignment groove, said alignment groove having the terminal end of a first optical fiber disposed therein, said fiber connector being equipped with a port adapted to releasably engage a jack containing the terminal end of a second optical fiber to be interconnected with the terminal end of said first optical fiber; and
    a cleaning device for cleaning the terminal end of said first optical fiber, said device comprising a nozzle having a cross-sectional profile which is essentially complimentary to the cross-sectional profile of said port, said nozzle being adapted to dispense a cleaning solution in the direction of the terminal end of said first optical fiber.

16. The combination of claim 15, wherein said nozzle is connected to a source of cleaning solution by way of an extended tube.

17. The combination of claim 16, wherein said source is a bottle equipped with a piston actuated pump adapted to withdraw liquid from said bottle.

18. A cleaning system for cleaning fiber optic connectors of the type which have a fiber alignment groove with the terminal end of an optical fiber disposed therein, said cleaning system comprising:

a nozzle adapted to dispense a cleaning solution; and a housing equipped with first and second ports, said first port adapted to releasably engage the optical fiber connector and said second port adapted to releasably engage said nozzle in an orientation such that said nozzle is directed at the terminal end of the optical fiber.

19. An optical fiber connector in combination with a cleaning device for cleaning the terminal end of an optical fiber disposed within said connector, said combination comprising:

an optical fiber connector equipped with a fiber alignment groove, said alignment groove having the terminal end of an optical fiber disposed therein;

a cleaning device for cleaning the terminal end of an optical fiber, said cleaning device comprising a nozzle adapted to dispense a cleaning solution along a first axis; and a holder adapted to hold said nozzle and said connector in a fixed orientation such that said first axis is aligned with said terminal end of said optical fiber.

20. A method for cleaning the terminal end of an optical fiber disposed within an optical fiber connector, comprising the steps of:

providing an optical fiber connector equipped with a fiber alignment groove, the alignment groove having the terminal end of an optical fiber disposed therein;

providing a nozzle adapted to dispense a cleaning solution;

providing a connector equipped with first and second apertures, wherein the first aperture is adapted to releasably engage the nozzle, and wherein the second aperture is adapted to releasably engage the connector and to hold the terminal end of the optical fiber in a fixed orientation with respect to the first aperture;

inserting the connector into the second aperture;

orienting the nozzle in the first aperture such that the nozzle is directed at the terminal end of the optical fiber; and dispensing a cleaning solution through the nozzle.

* * * * *